Sept. 17, 1968    W. R. STEWART    3,402,329
MULTIPLE CONDITION SWITCH CONTROLLING APPARATUS
Filed Aug. 6, 1965    2 Sheets-Sheet 1

INVENTOR.
WALTER R. STEWART

Sept. 17, 1968   W. R. STEWART   3,402,329
MULTIPLE CONDITION SWITCH CONTROLLING APPARATUS
Filed Aug. 6, 1965   2 Sheets-Sheet 2

INVENTOR.
WALTER R. STEWART ated Sept. 17, 1968

3,402,329
MULTIPLE CONDITION SWITCH CONTROLLING
APPARATUS
Walter R. Stewart, 8264 E. Beverly Drive,
San Gabriel, Calif. 91775
Filed Aug. 6, 1965, Ser. No. 477,901
10 Claims. (Cl. 317—142)

ABSTRACT OF THE DISCLOSURE

The specification discloses a multiple-condition switch controlling apparatus which, in its broadest form, may be said to comprise cycling means for cycling an auxiliary switch between open and closed positions for various control purposes. One specific form also discloses timing means in association with the cycling means arranged to automatically deenergize or effectively override the cycling means after a preselected period of time and for causing the auxiliary switch to be correspondingly positioned. The timing means may also be separated or independently used. One preferred form of the invention also discloses a selectively activatable overriding means for overriding the cycling means and for maintaining the auxiliary switch in a selected position for a selected period of time determined by the timing means and thereafter becoming operable to effectively inactivate or override the cycling means.

Generally speaking, the present invention relates to a combination multiple-condition control apparatus or unit including a selectively activatable automatic cycling means for repetitively cycling an auxiliary switch between open and closed positions, a timing means for automatically de-energizing, deactivating, or overriding said cycling means after a predetermined or preselected period of time and for effectively causing said auxiliary switch to be correspondingly positioned, and a selectively activatable means for effectively overriding said automatic cycling means and for maintaining said auxiliary switch means in a selected position (usually a closed position) for a predetermined period of time as determined by said timing means until said timing means effectively deenergizes, inactivates, or overrides said cycling means.

The invention, broadly speaking, relates to the combination just generically described and/or to various sub-combinations of the three individual portions thereof referred to above and/or to said three individual portions, per se.

One particular and highly advantageous application of the combination form of the invention referred to above may comprise an apparatus or unit of a small, lightweight, virtually foolproof type which may connect into the existing siren system of an emergency vehicle in a manner such as to make it possible to select any of three different conditions or modes or operation of the existing siren of the emergency vehicle for three different purposes as outlined hereinbelow.

A first automatic cycling siren condition of operation may be selected for producing the customary repetitive, intermittent cycling operation of the siren of the emergency vehicle for the purposes of warning all within hearing that an emergency vehicle is approaching. This condition of operation might be called, for identification purposes, an "AUTOMATIC SIREN" condition of operation.

A second non-cycling siren condition of operation may be selected wherein the siren of the emergency vehicle produces a steady output tone for a predetermined and/or preselected period of time until automatically terminated by the operation of the novel timing means of the present invention. This second condition of operation might be called an "ALERT" condition of operation.

A third cycling condition of operation may be selected wherein a conventional type, automatic, repetitive, intermittent cycling operation of the siren of the emergency vehicle is produced, but it is automatically terminated after a predetermined or preselected period of time. This condition of operation might be termed an "ATTACK AND DISASTER" condition of operation.

The three-condition exemplary combination form of the invention referred to above provides a highly advantageous arrangement for installation in an emergency vehicle since, when the first condition is selected, the emergency vehicle siren will operate in a conventional warning manner customary to such emergency vehicles but will do so automatically and without requiring manual or pedal operation in order to produce the conventional, repetitive, intermittent cycling operation of the motor vehicle siren in accordance with conventional prior art practice. In other words, when in the "AUTOMATIC SIREN" condition, an arrangement superior to conventional prior art arrangements is provided for the production of the conventional type of repetitive cycling, intermittent output tone. However, while this is advantageous, the second and third conditions of operation referred to above comprising the "ALERT" condition of operation and the "ATTACK AND DISASTER" condition of operation are even more advantageous in such an emergency vehicle for the corresponding control of the siren thereof since, at the present time, no means is provided for such "ALERT" and "ATTACK AND DISASTER" conditions of operation of an emergency vehicle siren and yet this is an extremely important advantage of the above-mentioned exemplary combination form of the invention since Civil Defense Authorities have selected and standardized the "ALERT" and "ATTACK AND DISASTER" type of signals which are to be employed throughout the nation, although at the present time they are produced primarily by multiple spaced, large fixed sirens, in order to provide adequate warning to all members of the populace in a city or town of what is known as an "ALERT" condition, which means about what it states—that is, that there is reason to be "alert" since some enemy attack might ensue—or what is known as an "ATTACK AND DISASTER" condition, which means just what it says—that is, that an attack and disaster is in progress or is imminent.

In the case of an "ALERT" signal, it is supposed to comprise a steady output tone maintained for a period of three to five minutes, after which it terminates and, in the case of "ATTACK AND DISASTER" signal, it is supposed to produce an intermittent, interrupted cycling type of output tone which automatically terminates after a period of time of three minutes.

It will be noted that the second and third conditions of operation of the novel above-mentioned exemplary combination form of the invention for use in emergency vehicles for controlling the conventional emergency vehicle siren thereof make it possible to selectively produce exactly the above-specified type of "ALERT" signal or "ATTACK AND DISASTER" signal, at the termination of which the apparatus shuts the emergency vehicle siren off automatically. This, of course, makes it possible for the operator of the emergency vehicle to merely switch to the "ALERT" condition or to "ATTACK AND DISASTER" condition, after which he may leave the emergency vehicle to perform various duties, such as law enforcement duties, fire prevention and/or fighting duties, civil defense or the like, and he need give no attention to the emergency vehicle and to the siren thereof, since it will automatically be controlled in accordance with the selected type of signal which is to be produced and at the end of the three-minute period of time, it will automatically shut itself off.

The above-mentioned features of the exemplary combination form of the invention referred to above are particularly advantageous since emergency vehicles all have self-contained electrical power plants and, therefore, are not subject to being effectively de-energized and depowered in the event that a main central power plant or installation of a city, or various substations or transformers thereof, are destroyed by an enemy attack or other disaster.

Furthermore, such emergency vehicles can be deployed in accordance with any desired pattern, which may be changed at will as determined in accordance with the requirements of the situation which may vary from moment to moment. This may be done by radio instructions emanating from a Civil Defense Director over a portable Civil Defense radio transmitter which, in turn, may also have its own self-contained electrical power supply and, thus, be completely divorced from any large central electrical power plants which might be destroyed by enemy attack or other disaster. In other words, the system employing a plurality of deployed emergency vehicles under the control of one or more central directing radio transmitters of a self-contained type lends itself ideally to the purposes of Civil Defense since it is relatively non-susceptible to being completely destroyed by any conceivable type of enemy attack or disaster and, thus, should, under virtually all conditions, be largely operative for Civil Defense purposes, and for any other purposes of a similar nature.

It will be understood that the above-mentioned exemplary combination form of the invention provides either an ideal primary type of Civil Defense warning system or a secondary back-up type of system to be employed in support of conventional Civil Defense warning systems now present in many large cities, which usually comprise a plurality of large sirens permanently installed at spaced locations throughout the city and electrically controlled from the central Civil Defense headquarters. In cities having such permanent Civil Defense warning installations, the provision of the novel apparatus of the present invention in all emergency vehicles will provide a great additional degree of protection since it will be available as an operative Civil Defense warning system in the event that the main, permanent Civil Defense warning system is largely rendered inoperative through the destruction of major portions of the city's electrical power supply and/or distribution systems, and/or through destruction of the permanent sirens themselves.

In other words, the novel exemplary combination form of the invention referred to above allows each emergency vehicle to operate its siren in a conventional automatic warning manner which is conventionally used throughout the country when a vehicle is used for emergency duty and must have the right-of-way through traffic. However, each emergency vehicle also becomes a fully self-contained Civil Defense mobile warning system.

With the above points in mind, it is an object of the present invention to provide novel apparatus having the advantages referred to herein and the features referred to herein, generically and/or specifically, and individually or in combination, and which is of relatively inexpensive, small, lightweight, foolproof construction adapted for ready mass manufacture at low cost, whereby to be conducive to widespread use of the invention.

It is a further object of the present invention to provide a novel apparatus of the character referred to hereinabove wherein it takes the form of a small control unit for an emergency vehicle siren as referred to above, and which makes possible the conventional automatic cycling operation of the siren of the emergency vehicle or the "ALERT" condition of operation thereof in accordance with the conditions outlined above, or the "ATTACK AND DISASTER" condition of operation thereof in accordance with the conditions outlined above, and which is of a nature such that it can be readily installed in an emergency motor vehicle at the factory or subsequently after its manufacture and sale.

It is a further object of the present invention to provide a selectively activatable automatic cycling apparatus of the character referred to above which may be employed for controlling the energization and de-energization of a variety of electrically energized objects other than emergency vehicle sirens. For example, it may control a boat siren or may control any of a great variety of various other types of electric power utilization devices. In other words, either the combination form of the invention or just the automatic cycling means, per se, may be so employed.

It is a further object of the invention to provide an automatic timer of the character referred to above which may be used for controlling the energization, deenergization, and/or the activation and deactivation of the various different electrically energizable devices or apparatuses other than the automatic cycling apparatus of the present invention and/or a siren. In other words, the timing apparatus may be employed either in combination with the remaining features of the invention or per se as a timing means for timing control of a great many different apparatuses and/or systems.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments of the invention are illustrated in the hereinbelow-described figures of the accompanying drawings and are described in detail hereinafter.

Figures 1, 4:
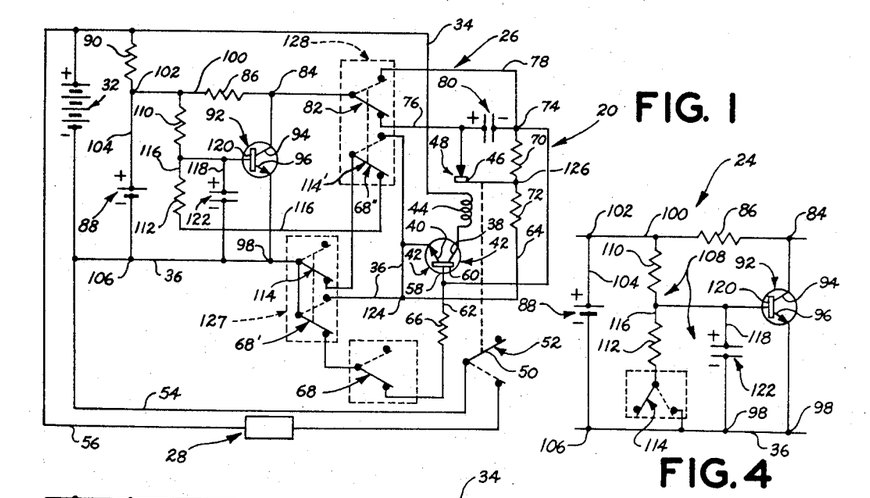
FIG. 1 is an electrical schematic view of one exemplary combination form of the invention adapted primarily for mounting in an emergency vehicle for controlling the operation of the conventional emergency vehicle siren in any of three different modes of operation comprising an "AUTOMATIC SIREN" mode of operation, an "ALERT" mode of operation, or an "ATTACK AND DISASTER" mode of operation. This view illustrates an actual electrical circuit.
FIG. 4 individually illustrates the timing circuit means portion of the equivalent switching circuit of FIG. 2 and indicates that it may be employed as a timer in association with a variety of circuits and electrical apparatuses other than the automatic cycling apparatus comprising the remainder of the apparatus shown in FIG. 2 and independently shown in FIG. 3.
Figure 2:
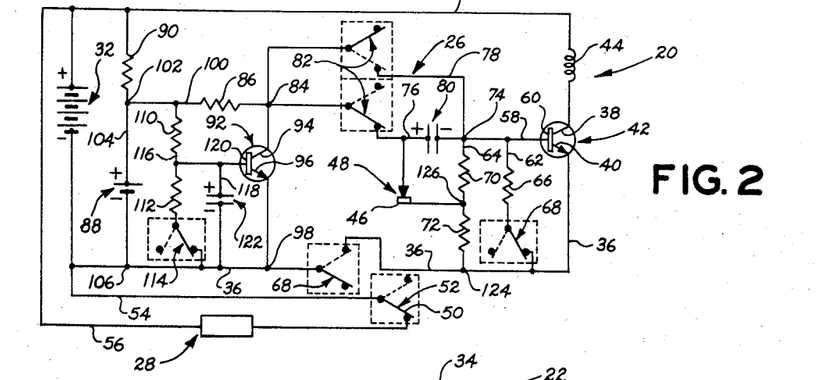
FIG. 2 shows in electrical schematic form the equivalent switching circuit corresponding to the actual circuit showing of FIG. 1.
Figure 3:
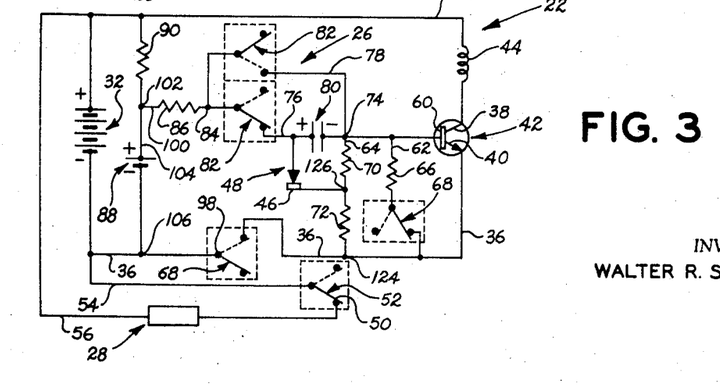
FIG. 3 individually illustrates that portion of the equivalent switching circuit of FIG. 2 which may be said to effectively comprise the automatic cycling apparatus portion thereof and indicates that it may be employed as an automatic cycling apparatus either independently or in association with a variety of circuits and electrical apparatuses or devices.

Generally speaking, the multiple-condition switch-controlling apparatus of the present invention, in the exemplary form for three-mode operation of an emergency vehicle siren as referred to hereinbefore, is generally designated by the reference numeral 20 and is shown in actual circuit form in FIG. 1 and in an equivalent switching circuit form in FIG. 2. Said complete combination apparatus generally designated at 20 includes the automatic cycling means, which is best shown in FIG. 3 which is there designated by the reference numeral 22 and also includes the timing means which is best shown in FIG. 4 and which is generally designated by the reference numeral 24. In addition to the automatic cycling means 22 and the automatic timing means 24, the complete combination unit form 20 of the invention shown in FIGS. 1 and 2 also includes an effective overriding or inactivating means for the automatic cycling operation of the apparatus as generally designated by the reference numeral 26 and which is operable to cause the motor vehicle siren generally designated at 28 to operate continuously and produce a continuous non-interrupted output tone until de-energized by the timing means generally designated at 24. Said overriding means 26 may also be effectively referred to as by-pass cycling circuit inactivation means effectively connected in parallel with the cycling capacitor 80 for the purposes just outlined.

The automatic cycling means generally designated at 22, as best shown in FIG. 3, includes an electrical power supply such as the emergency vehicle's battery 32 which is connected by leads 34 and 36 to the collector 38 and the emitter 40, respectively, of the transistor generally designated at 42. In the case of the collector lead 34, it should be noted that a relay coil 44 is connected in series therewith and is electromagnetically coupled with respect to the movable switch element 46 of the relay switch generally designated by the reference numeral 48 and is electromagnetically coupled for simultaneous operation of the movable switch element 50 of an auxiliary switch, generally designated by the reference numeral 52, which may be said to comprise the siren-energizing switch since it is connected by the leads 54 and 56 in series with the electrically energizable (and normally motor-driven) siren 28 and with said emergency vehicle battery 32.

Said automatic cycling circuit also includes the base lead 58 which is connected to the base 60 of the transistor 42 and is connected to the previously mentioned emitter lead 36 by two parallel leads 62 and 64. The lead 62 includes a resistor 66 and a switch 68 which is shown in closed condition and which effectively comprises the "AUTOMATIC SIREN" switch. It should be noted that the same "AUTOMATIC SIREN" switch is also designated at 68 in the emitter lead 36 between the point 124 and the negative terminal of the battery 32 and at said location is shown in open condition. This showing in FIG. 2, which is an equivalent switching circuit, of the switch 68 at two different locations, does not mean that there are two switches 68 but the two different locations merely show the closed and open connections of the same automatic siren switch 68 with respect to the rest of the circuit, and a similar arrangement is present with respect to the other double throw switches shown in FIG. 2 wherein both the closed and open connections of each such switch with respect to the rest of the circuit are shown at different locations in a manner similar to the just-described two-location showing of the automatic siren switch 68. The other lead 64 mentioned above includes two resistors 70 and 72, with the previously mentioned movable relay switch element 46 being connected to said lead 64 between the two resistors 70 and 72 at the circuit junction point 126. The circuit junction point 74 has two leads 76 and 78 connected in parallel between the circuit points 74 and 84—through the cycling (charging and discharging) frequency-controlling capacitor 80 and the closed overriding switch means 82 in the case of the lead 76, and in the case of the parallel lead 78, through the same overriding switch 82 which is shown in open condition, it being understood that when it is closed, the overriding switch 82 in the lead 76 will be opened and vice versa. The circuit junction point 84 of the two parallel circuits 76 and 78 is then connected through the resistor 86 to the positive terminal of the biasing battery generally designated at 88, the negative terminal of which is connected to the previously mentioned emitter lead 36 at the circuit junction point 106.

In the above description of the automatic cycling circuit 22, it should be noted that there is an additional resistor 90 connected between the circuit junction point 102 and the collector lead 34, and it should also be noted that the circuit 78 and the overriding switch 82 effectively comprise what might be generally referred to as an overriding means or a by-pass cycling circuit inactivation means for by-passing the cycling or charging capacitor 80 whereby to change the mode of operation of the automatic cycling means 22 from the intermittent alternate opening and closing of the auxiliary switch 52 to the closing thereof and the maintaining of said auxiliary switch 52 in said closed condition until the timing means, generally designated at 24, effectively causes the opening of said auxiliary switch means 52 in a manner which will be described hereinafter.

Also, in connection with the above description of the automatic cycling means 22, it should be noted that the charging or cycling capacitor 80 and the resistors 70, 72, and 86 together effectively comprise what might be referred to as charging and discharging RC circuit means controlling the frequency of the automatic cycling operation of the automatic cycling means 22 with the "ON TIME" corresponding to closure of the auxiliary switch 52 being determined (assuming a constant value of the charging capacitor 80) by the value of the resistances 86, 70, and 72 while the "OFF TIME" corresponding to open condition of the auxiliary switch 52 is determined by the value of the resistance 70 only.

Incidentally, it should be noted that the biasing battery 88 and the resistance 86 are common to both the automatic cycling means 22 and the timing means 24 when in the combination form shown in FIGS. 1 and 2. However, if said automatic cycling means 22 and/or said timing means 24 are to be used independently, then each would have a biasing battery similar to that shown at 88 and a resistor similar to that shown at 86. They are merely provided in common in the combination form of the apparatus of the present invention for reasons of circuit simplicity.

The timing means generally designated at 24, as best shown in FIG. 4, effectively provides a transistor, generally designated at 92, having its collector 94 and its emitter 96 connected between the previously mentioned circuit junction point 84 and a circuit junction point 98 in the previously mentioned emitter lead 36. It should be noted that said first-mentioned circuit junction point 84 to which the collector 94 is connected, connects to a lead 100, which connects through the previously mentioned resistor 86, the circuit junction point 102, and a lead 104 to the positive terminal of the previously mentioned biasing power supply or battery 88 and, in parallel therewith, connects through the previously mentioned resistor 90 to the previously mentioned collector lead 34 which in turn connects to the positive terminal of the main emergency vehicle power supply 32.

The second above-mentioned circuit junction point 98 connected to the emitter 96 of the transistor 92, as mentioned above, is connected to the previously mentioned emitter lead 36, which in turn is connected to the circuit junction point 106, which is connected in parallel to the negative terminal of the biasing battery 88 and also the negative terminal of the main emergency vehicle battery 32.

In other words, it may be said that the collector 94 and emitter 96 of the timing transistor 92 effectively comprise a transistor switch connected between the points of positive and negative potential 84 and 98 and present thereto either a high resistance when the timing transistor 92 is in a substantially non-conducting state or mode or an extremely low resistance when the transistor 92 is in a conducting state or mode. Thus, it will be understood that when said timing transistor 92 is in said substantially non-conducting mode or state and effectively places a high resistance between the points 84 and 98, a substantial control potential is placed across the previously mentioned charging and discharging RC circuit means of the previously described automatic cycling means individually designated at 22 in FIG. 3 and shown in combination with the timing means 24 in FIG. 2 so that said automatic cycling means 22 may operate in the automatic repetitive cycling manner previously described.

However, it should be understood that whenever said timing transistor 92 is in said conducting state or mode mentioned above, it effectively places an extremely low resistance between the circuit points 84 and 98 and causes the potential of point 84 to drop toward the potential of point 98 and thus effectively removes the control potential which must exist between said points 84 and 98 for operating the automatic cycling means portion 22 (individually shown in FIG. 3) of the combination form of the apparatus illustrated in FIG. 2. In other words, when the timing transistor 92 is in said conducting mode or state, it effectively inactivates, de-energizes, and/or prevents the operation of said automatic cycling means 22.

The conducting state or mode of the transistor 92 and the substantially non-conducting mode or state thereof are under the control of what might be termed a charging and discharging RC circuit means, generally designated at 108, and including resistors 110 and 112 and a normally closed switch, generally designated at 114, all in a lead 116 connected between the previously mentioned leads 100 and 36 directly across the previously mentioned circuit junction points 102 and 106, which are connected to the positive and negative terminals, respectively, of the biasing battery 88.

Said timing charging and discharging RC circuit means 108 also includes a lead 118 connected at one end of the lead 116 between the two resistors 110 and 112 and connected at the opposite end to the base element 120 of the timing transistor 92 and having a timing capacitor 122 connected from the lead 118 to the emitter lead 36 in parallel to the resistor 112 and the normally closed switch 114.

As pointed out above, it will be noted that certain portions of the circuitry of the timing means 24 are common to, and also comprise a part of, the previously described automatic cycling means 22. This is readily apparent from a careful comparative examination of the automatic cycling means 22 as individually shown in FIG. 3, the timing means 24 as individually shown in FIG. 4, and the combination thereof as shown in FIG. 2.

While the actual circuit components shown in FIG. 1 and the equivalent switching circuit components shown in FIG. 2 may, under varied conditions of use, assume a variety of different values, certain exemplary but non-specifically-limiting values for various of the components thereof will be employed in the description of the operation thereof which follows hereinafter, and said exemplary values are listed hereinbelow as follows:

Vehicle battery 32 ____________________volts__ 12
Biasing battery 88 ____________________do____ 1.4
Resistor 90 __________________________ohms__ 680
Resistor 110 _________________________do____ 560
Resistor 112 _________________________do____ 10
Resistor 86 __________________________do____ 16
Resistor 70 __________________________do____ 16
Resistor 72 __________________________do____ 22
Resistor 66 __________________________do____ 91

It should be noted that there are two important components in the exemplary combination form of the invention illustrated in actual circuit form in FIG. 1 and in equivalent switching circuit form in FIG. 2 and comprising the elements 80 and 122, which have been previously referred to as the cycling capacitor 80 and the timing capacitor 122 because that is functionally what they are in the apparatus, as illustrated in the drawings and as described in detail herein. However, it should be particularly noted that I have chosen to use as said cycling capacitor 80 and said timing capacitor 122, electrochemical batteries, similar to the biasing battery 88 and, in each case, comprising a nickel cadmium cell. It will be noted that the previously mentioned and above-listed biasing battery 88 is connected in circuit so as to have its positive terminal directly connected to the circuit point 102 and so as to have its negative terminal directly connected to the circuit point 106 and carries a 1.4 volt charge which it applies to said points with said polarity. However, each of the similar electrochemical batteries, comprising similar nickel cadmium cells, and effectively comprising the functional cycling capacitor 80 and the functional timing capacitor 122 do not carry a 1.4 voltage thereacross, but are substantially discharged except for the voltages placed thereacross by the circuit points connected to opposite sides thereof during the sequence of operation of the apparatus as described in detail hereinafter. In other words, said electrochemical batteries comprising (nickel cadmium cells) in the case of the elements 80 and 122, function primarily as electrochemical capacitors capable of being charged and discharged in accordance with circuit conditions and connections as detailed hereinafter.

Incidentally, it should be noted that, as connected in the figures of the drawings, the composite electrochemical battery and cycling capacitor 80 has the normal negative terminal of said battery connected to the circuit point 74 and the base element 60 of the cycling transistor 42, while the composite electrochemical battery and timing capacitor 122 has the normal positive terminal of said battery connected to the base element 120 of the timing transistor 92.

The operation of the complete exemplary combination form of the invention generally designated at 20 will be briefly described in a series or sequence of chronological steps starting from the original "OFF" condition of the apparatus.

In the event that the previously mentioned "AUTOMATIC SIREN" mode of operation of the apparatus is to be selected, the double throw switch 68 is moved from the "OFF" position in which it is shown in full lines in FIG. 1 to the "ON" position shown in phantom in FIG. 1. This corresponds in FIG. 2 to closing said switch 68 where it appears in the lead 36 and to opening it where it appears in the lead 62 of the equivalent circuit showing of the invention illustrated in FIG. 2. This effectively changes the simplified connected circuit portions of FIG. 5, which correspond to the actual circuit of FIG. 1 and the equivalent switching circuit of FIG. 2 in the "OFF" condition, to the connected circuit portion shown in FIG. 6.

Figure 5:
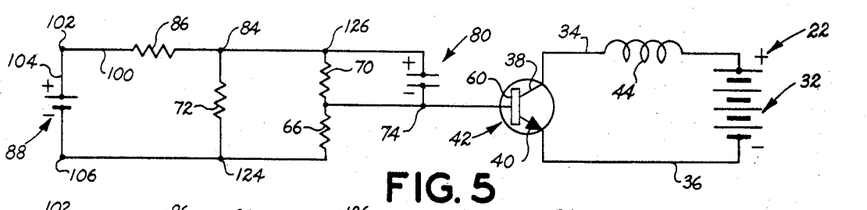
FIG. 5 illustrates the effectively connected portion of the equivalent switching circuit of FIG. 2 when the circuit is in the "OFF" condition corresponding to an inoperative condition for each of the three different possible modes of operation thereof.

It should be noted that, when the automatic cycling means 22 is in the "OFF" condition shown in FIG. 5, the cycling capacitor 80 continuously has a small charge of about 0.12 volt thereacross. Also, it should be noted that the base circuit of the transistor 42 connected to the base element 60 thereof is open and essentially no collector current flows through the collector lead 34. However, it should be clearly noted that the connected circuit or portions shown in FIG. 6 exist only momentarily after the moving of the siren switch 68 on the "ON" position shown in FIG. 1. Incidentally, it should be noted that certain voltages exist between various circuit points in the initial "OFF" condition shown in FIG. 5 and also in the momentary connected circuit condition shown in FIG. 6 which exists momentarily after the siren switch 68 of FIG. 1 is moved to the "ON" position. Said voltages are as follows:

|  | Volts |
|---|---|
| From point 102 to point 124 | 1.4 |
| From point 126 to point 124 | 0.8 |
| From point 126 to point 74 | 0.12 |
| From point 74 to point 124 | 0.68 |

Figure 6:
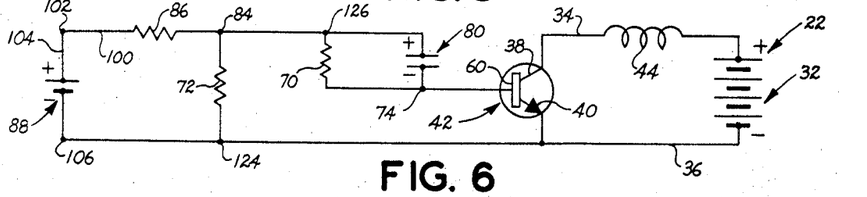
FIG. 6 illustrates the effectively connected portion of the equivalent switching circuit of FIG. 2 when the circuit is in the "INITIAL ON" condition corresponding to an operative condition for the automatic cycling portion of the apparatus or, in other words, corresponding to the "INITIAL ON" condition of the "AUTOMATIC SIREN" mode of operation of the apparatus.

The above condition, as shown in FIG. 6 applies 0.68 volt between the base element 60 and the emitter element 40 of the cycling transistor 42 and, under this biasing condition, the collector circuit lead 34 conducts substantially and the current flow through the relay coil 44 reaches a predetermined magnitude which might be termed an energization or operation magnitude sufficient to begin to move the armature and relay contact 46. As soon as this occurs, the normally closed relay switch, generally indicated at 48, opens and the connected circuit illustrated in FIG. 7 exists, which might be termed the beginning of the "ON" cycle or mode of operation and at that time the following set of voltages exists between the same circuit points as referred to above. Said voltages are detailed below, as follows:

|  | Volts |
|---|---|
| From point 102 to point 124 | 1.4 |
| From point 126 to point 124 (approximately) | 0.9 |
| From point 126 to point 74 | 0.12 |
| From point 74 to point 124 (approximately) | 0.8 |

Figure 7:
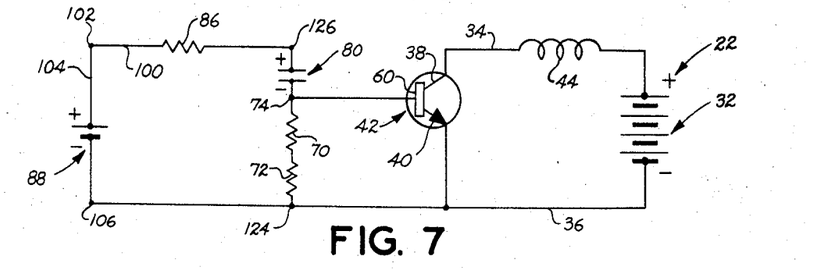
FIG. 7 illustrates the connected portions of the equivalent switching circuit of FIG. 2 immediately following the "INITIAL ON" condition illustrated in FIG. 6 after the current through the relay coil has risen to a predetermined magnitude sufficient to energize said relay coil and open the relay-operated normally closed cycling switch.

The above circuit condition and voltage values, as shown in FIG. 7, effectively applies 0.8 volt between the base electrode 60 and the emitter electrode 40 of the cycling transistor 42, and this value of biasing voltage effectively causes the cycling transistor 42 to go into a state of saturation allowing maximum conduction between the emitter 40 and the collector 38. This further increases the current flow through the relay coil 44 and causes the relay armature and switch element 46 to move to its extreme open position rapidly which also simultaneously operates the coupled switch 50 shown in FIG. 1 into closed relationship whereby to connect the main emergency vehicle battery 32 through the leads 54 and 56 to the siren 28 whereby to effectively energize same and cause the siren 28 to be operated and to emit the typical siren tone. At the same time that the above action is occurring to the connected circuit of FIG. 7, the electrochemical charging capacitor 80 begins to increase its charge as current flows through the path including the points 102, 84, 74, 126, and 124. As the charge on the cycling capacitor 80 increases, the voltage existing between the transistor base element 60 and the transistor emitter element 40 drops gradually until the transistor 42 comes out of saturation (at about 0.6 volt). At approximately 0.5 volt, the collector circuit current flowing through the relay coil 44 falls to a predetermined minimum deactivation value such that the relay is effectively de-energized and the relay switch element 46 moves back under the action of a biasing spring (not shown) to the normally closed condition shown in FIG. 2 which brings about the effectively connected circuit portion illustrated in FIG. 8 and which also effectively opens the previously mentioned siren switch 50 and de-energizes the emergency vehicle siren 28.

Figure 8:
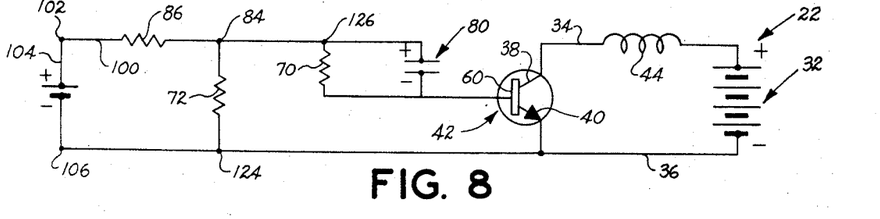
FIG. 8 illustrates the connected portions of the equivalent switching circuit of FIG. 2 succeeding the condition thereof as illustrated in FIG. 7 after the charging cycle has reached a point where the voltage biasing the transistor has dropped to a value such that current through the relay coil has dropped to a lower predetermined magnitude which allows the normally-closed and spring-biased relay-operated cycling switch to close, which effectively produces the equivalent circuit shown in FIG. 8. In other words, this circuit shows the connected portions of the circuit at the end of the charging cycle, and it will be noted that it corresponds exactly to the showing of FIG. 6 illustrating the "INITIAL ON" condition.

In the instant that the circuit assumes the connected configuration shown in FIG. 8, a very low voltage exists between the points 74 and 124 which is, of course, applied between the base electrode 60 and the emitter electrode 40 of the cycling transistor 42 and which is of the order of approximately 0.2 volt, which causes the previously mentioned de-energizing operation of the relay coil 44 and the consequent closure of the relay switch element 46 and corresponding opening of the siren switch 50 to occur very rapidly and completely, thus removing any possibility of chatter. Next, the cycling capacitor 80 discharges through the resistor 70 until the voltage between the points 126 and 74 again reaches the value of 0.12 volt, and the voltage between points 74 and 124 reaches the value of 0.68 volt. When these voltage values have been reached, the circuit, and the conditions thereof, are now back to the "INITIAL ON" condition illustrated earlier in FIG. 6, and the cycle of operations begins again with the current through the relay coil 44 again beginning to rise and beginning to operate the relay in the manner previously described for opening the switch element 46 and for closing the main siren switch 50 in the manner previously described.

As noted before, the total charging time for the capacitor 80, which corresponds to "ON TIME" for the siren switch 52 and the siren 28, is determined (with the value of the capacitor 80 constant) by the total resistance of the three resistors 86, 70, and 72, while the total discharge time for the capacitor 80, which corresponds to "OFF TIME" for the siren switch 52 and the siren 28, is determined by the resistance of the resistor 70 only. For equal "ON" and "OFF" times, said timing resistances will not be equal since the total circuit voltages effective during the charging and discharging cycles are different in each case—said voltage being equivalent to 1.4 minus the voltage between point 126 and point 74 for the charging cycle, and being the voltage existing between the points 126 and 74 only for the discharging cycle.

The above described the operation of the automatic cycling means 22, and this covers the complete operation of the apparatus 20, when operating in accordance with the "AUTOMATIC SIREN" or first condition or mode of operation referred to hereinbefore.

However, when the apparatus is to be operated in the

"ATTACK AND DISASTER" or third mode of operation referred to hereinbefore where the automatic cycling is to continue for a three-minute period of time and then is to automatically terminate, the automatic timing means 24 is effectively connected to the remainder of the apparatus and circuitry, generally designated by the reference numeral 20, by opening the normally closed timing switch 114, which is effectively coupled to the previously mentioned siren switch 68 of FIG. 2 (at both of the closed and open connection positions thereof in the leads 62 and 36 thereof) so that said siren switch 68 of FIG. 2 is moved to the "ON" condition, which corresponds to the circuit arrangement illustrated in FIG. 6, at the same time that the timing switch 114 of FIGS. 1, 2 and 4 is moved to the "ON" position, which is an open position as shown in FIG. 4. When this occurs, the timing capacitor 122, which normally carries a residual charge of approximately 0.03 volt and which normally effectively holds the timing transistor 92 in a non-conducting state or mode, then begins to charge through resistor 110 until approximately 0.6 volt is reached across the timing capacitor 122, and this, of course, modifies the bias on the timing transistor 92 which then begins to conduct and, as the timing capacitor 122 continues to charge, the transistor 92 goes into saturation and has a maximum current flow through the collector output circuit, point 84 therein, and the resistor 86. This increasing current flow through the resistor 86 causes an increasing voltage drop across the resistor 86 and causes point 84 to drop toward the potential at point 98. This effectively removes the potential between point 84 and point 98 and, therefore, effectively removes the potential applied to the charging and discharging RC circuit means of the automatic cycling means 22, and the cycling transistor 42 no longer can reach the conductive mode or condition of operation. Therefore, it becomes evident that the previously described automatic cycling operation of the automatic cycling means 22 automatically terminates when the timing means 24 has effectively caused said potential between the points 84 and 98 to drop to said low value which prevents the cycling transistor 42 from reaching conduction in accordance with the automatic cycling sequence of operations thereof, as described in detail hereinbefore. In the arrangement just desribed, said period of time delay is normally set for approximately three minutes, since this is a conventional Civil Defense "ATTACK AND DISASTER" mode of operation.

When the previously referred to "ALERT" mode of operation is to be achieved, the overriding switch 82 is operated into the "ON" condition, which corresponds to closure of the switch 82 shown in the lead 78 of FIG. 2 and to opening of the same switch 82 in the lead 76, whereby to effectively by-pass or shunt the cycling capacitor 80. The cycling condition overriding switch 82 is effectively coupled with respect to the previously mentioned timing switch 114 of FIG. 2 so that said timing switch 114 of FIG. 2 is moved to the "ON" condition (with said switch open as shown in FIG. 4), at the same time that the cycling condition overriding switch 82 of FIGS. 1 and 2 is moved to the "ON" condition effectively by-passing the cycling capacitor 80. The closure of the by-pass circuit 76 shown in FIG. 2, and the opening of the normal parallel circuit portion 78, of course, completely stops the cycling operation of the automatic cycling means 22, but allows the transistor 42 to remain in the conductive mode or state which will maintain the cycling relay switch 48 open and the siren switch 52 closed until effectively de-energized and inactivated after a period of three to five minutes by operation of the automatic timing means 24 in the manner just described. Thus, when in this condition, a continuous siren tone will be produced by the siren 28 for a period of three to five minutes, after which it will automatically cease.

It should be noted that the effective coupling, mentioned above, of the normally closed timing switch 114 relative to the previously mentioned siren switch 68 of FIG. 2 for simultaneous operation thereof into "ON" condition when the so-called "ATTACK AND DISASTER" mode of operation is to be selected, is actually accomplished by providing an extra double throw switch, shown individually only in FIG. 1 and designated by the reference numeral 68' in FIG. 1, and connected in parallel to the regular double throw siren switch 68 and mechanically coupled to the timing switch 114 in a combination "ATTACK AND DISASTER" switch means generally designated by the phantom line box shown at 127 in FIG. 1.

It should be noted that the effective coupling, mentioned above, of the cycling condition overriding switch 82 relative to the normally closed, previously mentioned timing switch 114 of FIG. 2 for simultaneous operation thereof into the "ON" condition when the so-called "ALERT" mode of operation is to be selected, is actually accomplished by providing an extra double throw switch, shown individually only in FIG. 1 and designated by the reference numeral 114'–68", normally when "OFF" being connected in closed series relationship with the regular timing switch 114 and in open parallel relationship with the regular siren switch 68 and mechanically coupled to the previously mentioned cycling condition overriding switch 82 in a combination "ALERT" switch means generally designated by the phantom line box shown at 128.

It will be noted that all three of the different conditions or modes of operation of the above-described exemplary combination form of the present invention have been set forth in full above and provide all of the major advantages detailed hereinbefore.

However, it should be clearly noted that the invention is not limited to said combination form, but may include any or all of the three individual features of the combination form used conjointly or independently, or in any combination thereof, for controlling sirens, or various other electrically energizable devices.

Figure 9:
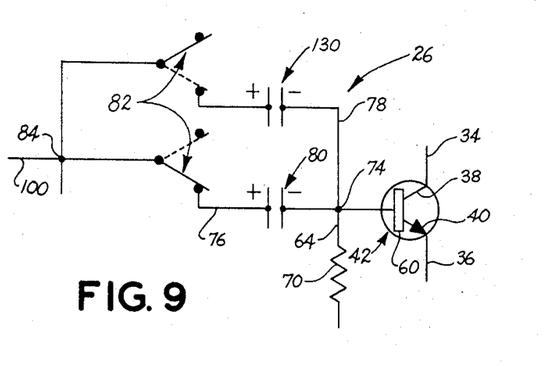
FIG. 9 is a fragmentary showing of a circuit generally similar to FIG. 2 in most respects, but illustrating a slight modification thereof wherein the cycling rate or the frequency of repetition of the automatic intermittent cycling apparatus can be varied between either of two frequencies. This is particularly advantageous for use in controlling the automatic cycling operation of a boat foghorn, siren, or the like, which is supposed to have certain frequencies when a boat carrying same is in inland or coastal waters and is supposed to have a different frequency when the boat is in international waters.

For example, FIG. 9 illustrates a slight modification of the arrangement just described above for effectively overriding or inactivating the automatic cycling means 22 and, in this case, as illustrated in FIG. 9, does not comprise means for inactivating the automatic cycling means 22 but merely comprises means for changing the frequency or repetition rate of the automatic cycling operation thereof. This is done through the provision of an auxiliary cycling capacitor 130 positioned in the by-pass circuit 78 and adapted to be connected by the operation of the overriding or by-pass cycling control switch 82 so as to effectively replace the main cycling capacitor 80 and thus provide a different value of capacitance in the charging and discharging RC circuit means controlling the frequency rate of the automatic cycling operation of the automatic cycling means 22. It will be noted that FIG. 9 only partially illustrates the apparatus, primarily with respect to the portion just specifically described for changing the effective capacity of the automatic cycling capacitor, since the showing of other portions of the circuit would merely be repetitive in the light of the showing thereof in FIG. 2. An arrangement of the type illustrated fragmentarily in FIG. 9 is particularly advantageous for use in controlling a boat foghorn or the like, since one frequency of automatic cycling operation is normally required in inland or coastal waters, while a second and different frequency of cycling operation is normally required in international waters.

All that has been said hereinbefore relative to the functional cycling capacitor 80 and the functional timing capacitor 122 actually comprising chargeable and dischargeable electrochemical battery means, taking the form of nickel cadmium cells, which functionally comprise electrochemical capacitor means as used in the apparatus of the present invention, is equally true with respect to the auxiliary cycling capacitor 130 mentioned in the preceding paragraph, which would normally also comprise such an electrochemical battery taking the form of a chargeable and dischargeable nickel cadmium cell similar to the one previously described at 80 and similarly connected with respect to polarity of the battery, although, of course, being connected in parallel thereto as described above.

Incidentally, in connection with all of said functional capacitors 80, 122, and 130, which, as described hereinbefore, comprise chargeable and dischargeable electrochemical batteries, each taking the form of a similar nickel cadmium cell, it should be noted that the invention is not specifically limited to such an arrangement in all forms thereof, but may employ various other functional capacitor means in lieu thereof in certain forms of the invention—it being necessary, of course, to precisely maintain the appropriate effective capacitance values in order to maintain the proper charging and discharging times.

The above merely illustrates a few applications of the three subcombination portions of the exemplary complete combination form of the invention illustrated in the drawings and described in detail hereinabove, and it should be clearly understood that the invention is not specifically limited to said exemplary combination form of the apparatus intended for use in emergency vehicles for the purposes outlined above.

It should be clearly noted that the apparatus of the present invention may also be employed for any type of cyclic or time delay energization of various electrically operated devices, such as electromagnetic control valves or the like, such as for controllably operating aerosol spray devices for the purpose of emitting various applicatory agents for the sickroom or the like, such as disinfectants or germicides, deodorants, or for emitting insecticides or any other desired applicatory agents which are to be controllably disseminated and/or applied to a desired area, region, or space. This, of course, is merely indicative of certain of the many possible uses of the novel control apparatus of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A multiple-condition control apparatus comprising: cycling circuit means including a non-linear, bias-controlled, electronic amplifier means having at least three electrodes comprising an effective collector or anode, an effective emitter or cathode, and an effective base or control grid, said effective collector or anode of said amplifier means being provided with an output circuit provided with, and adapted to be connected to, the positive terminal of a main power supply, the other negative terminal of which is adapted to be connected to said effective emitter or cathode, said cycling circuit means also including charging and discharging RC circuit means effectively connected with respect to said effective base or control grid and said effective emitter or cathode of said amplifier means when said cycling means is operative, said charging and discharging RC circuit means being effectively provided with bias voltage supplying means for effectively providing a charging potential across said charging and discharging RC circuit means, said charging and discharging RC circuit means having a plurality of resistor means and at least one charging and discharging effective capacitor means therein adapted to be differently connected with respect to said plurality of resistor means during charging and discharging cycles of said effective capacitor means whereby to correspondingly effectively modifyingly bias said effective base or control grid relative to said effective emitter or cathode of said amplifier means during said charging and discharging cycles, said cycling circuit means also including cycling switch means operable between first normally spring biased closed and second open positions and connected with respect to said charging and discharging RC circuit means for differently connecting said plurality of resistor means and said charging and discharging effective capacitor means of said RC circuit means in a repetitive cycling manner in response to variation of current flow through said amplifier means and through said output circuit thereof between an upper predetermined activation magnitude and a lower predetermined deactivation magnitude corresponding to the opening and closing of said cycling switch means; an auxiliary circuit control switch means operable for opening and closing an auxiliary circuit in a repetitive intermittent cycling manner and means effectively coupling same with respect to said cycling switch means for correlated operation of said auxiliary circuit control switch means thereby in a corresponding circuit closing and circuit opening manner; said output circuit being provided with electrically energizable actuator means operatively coupled with respect to said cycling switch means for effectively moving it from said first closed position into said second open position when output current flowing through said output circuit and through said actuator means exceeds said upper predetermined activation magnitude and for effectively allowing said cycling switch to resiliently return to said first normally closed position when output current flowing through said output circuit and said actuator means falls below said lower predetermined deactivation magnitude, thus producing a continuous cycling action of said cycling switch means and said auxiliary circuit switch means coupled thereto in a manner having a switch-closed time and a switch-open time and a total cycle time which are functions of the RC values of corresponding charging and discharging portions of said charging and discharging RC circuit means; timing circuit means effectively connected across said cycling circuit means and operable after a predetermined period of time from initial energization thereof to effectively deactivate said cycling circuit means, said timing circuit means including charging and discharging timing RC circuit means and a non-linear, bias-controlled, electronic timing amplifier means having at least three electrodes comprising an effective collector or anode, an effective emitter or cathode, and an effective base or control grid, connected to said RC charging and discharging circuit means in a manner which normally biases same into a low-conduction mode or state of operation, said timing circuit means being provided with a timing switch means which, upon manual movement thereof from a first normally closed position to a second open position, modifies the connection of said bias voltage supplying means to said charging and discharging timing RC circuit means relative to said timing amplifier means in a manner such as to cause it to quickly reach a large-conduction mode or state of operation where a predetermined upper magnitude current flows therethrough, said timing circuit means having an output circuit portion connected to said timing amplifier means and having a voltage-dropping load resistor means therein adapted, when said predetermined upper magnitude current flows through said timing amplifier means, to effectively reduce the voltage applied by said bias voltage supplying means to said charging and discharging RC circuit means of said cycling circuit means to a value insufficient to provide an effective bias voltage such as to allow current flow through said cycling amplifier means to rise to said upper predetermined activation magnitude and thus effectively inactivating said cycling circuit means after a time delay period determined by the RC values of the charging and discharging timing RC circuit means when in the charging condition achieved by manual operation of said timing switch means into said second open position.

2. Control apparatus as defined in claim 1, wherein said timing amplifier means of said timing circuit means comprises a solid-state semi-conductor amplifier device of a type wherein said three electrodes comprise a collector, an emitter, and a base.

3. Control apparatus as defined in claim 1, wherein each of said amplifier means of said cycling circuit means and said timing circuit means comprises a solid-state semi-conductor amplifier device of a type wherein said three electrodes comprise a collector, an emitter, and a base.

4. A multiple-condition control apparatus comprising: cycling circuit means including a non-linear, bias-controlled, electronic amplifier means having at least three electrodes comprising an effective collector or anode, an effective emitter or cathode, and an effective base or control grid, said effective collector or anode of said amplifier means being provided with an output circuit provided with, and adapted to be connected to, the positive terminal of a main power supply, the other negative terminal of which is adapted to be connected to said effective emitter or cathode, said cycling circuit means also including charging and discharging RC circuit means effectively connected with respect to said effective base or control grid and said effective emitter or cathode of said amplifier means when said cycling means is operative, said charging and discharging RC circuit means being effectively provided with bias voltage supplying means for effectively providing a charging potential across said charging and discharging RC circuit means, said charging and discharging RC circuit means having a plurality of resistor means and at least one charging and discharging effective capacitor means therein adapted to be differently connected with respect to said plurality of resistor means during charging and discharging cycles of said effective capacitor means whereby to correspondingly effectively modifyingly bias said effective base or control grid relative to said effective emitter or cathode of said amplifier means during said charging and discharging cycles, said cycling circuit means also including cycling switch means operable between first normally spring biased closed and second open positions and connected with respect to said charging and discharging RC circuit means for differently connecting said plurality of resistor means and said charging and dicharging effective capacitor means of said RC circuit means in a repetitive cycling manner in response to variation of current flow through said amplifier means and through said output circuit thereof between an upper predetermined activation magnitude and a lower predetermined deactivation magnitude corresponding to the opening and closing of said cycling switch means; an auxiliary circuit control switch means operable for opening and closing an auxiliary circuit in a repetitive intermittent cycling manner and means effectively coupling same with respect to said cycling switch means for correlated operation of said auxiliary circuit control switch means thereby in a corresponding circuit closing and circuit opening manner; said output circuit being provided with electrically energizable actuator means operatively coupled with respect to said cycling switch means for effectively moving it from said first closed position into said second open position when output current flowing through said output circuit and through said actuator means exceeds said upper predetermined activation magnitude and for effectively allowing said cycling switch to resiliently return to said first normally closed position when output current flowing through said output circuit and said actuator means falls below said lower predetermined deactivation magnitude, thus producing a continuous cycling action of said cycling switch means and said auxiliary circuit control switch means coupled thereto in a manner having a switch-closed time and a switch-open time and a total cycle time which are functions of the RC values of corresponding charging and discharging portions of said charging and discharging RC circuit means; said cycling circuit means being provided with by-pass cycling circuit inactivation and overriding means effectively connected in parallel to said effective capacitor means of said charging and discharging RC circuit means of said cycling circuit means, and selectively operable overriding switch means for connecting said by-pass cycling circuit inactivation and overriding means in lieu of said effective capacitor means of said charging and discharging RC circuit means when it is to be effectively inactivated and the cycling amplifier means thereof is to assume a single steady-state conduction mode of operation having current flow therethrough at least equal to said upper predetermined activation magnitude.

5. Control apparatus as defined in claim 4, including timing circuit means effectively connected across said cycling circuit means and operable after a predetermined period of time from initial energization thereof to effectively deactivate said cycling circuit means.

6. Control apparatus as defined in claim 4, including timing circuit means effectively connected across said cycling circuit means and operable after a predetermined period of time from initial energization thereof to effectively deactivate said cycling circuit means by effectively reducing the potential applied by said bias voltage supplying means to said RC charging and discharging circuit means of said cycling circuit means.

7. Control apparatus as defined in claim 4, including timing circuit means effectively connected across said cycling circuit means and operable after a predetermined period of time from initial energization thereof to effectively deactivate said cycling circuit means, said timing crcuit means including charging and discharging timing RC circuit means, and a non-linear, bias-controlled, electronic timing amplifier means having at least three electrodes comprising an effective collector or anode, an effective emitter or cathode, and an effective base or control grid, connected to said RC charging and discharging circuit means in a manner which normally biases same into a low-conduction mode or state of operation, said timing circuit means being provided with a timing switch means which, upon manual movement thereof from a first normally closed position to a second open position, modifies the connection of said bias voltage supplying means to said charging and discharging timing RC circuit means relative to said timing amplifier means in a manner such as to cause it to quickly reach a large-conduction mode or state of operation where a predetermined upper magnitude current flows therethrough, said timing circuit means having an output circuit portion connected to said timing amplifier means and having a voltage-dropping load resistor means therein adapted, when said predetermined upper magnitude current flows through said timing amplifier means, to effectively reduce the voltage applied by said bias voltage supplying means to said charging and discharging RC circuit means of said cycling circuit means to a value insufficient to provide an effective bias voltage such as to allow current flow through said cycling amplifier means to rise to said upper predetermined activation magnitude and thus effectively inactivating said cycling circuit means after a time delay period determined by the RC values of the charging and discharging timing RC circuit means when in the charging condition achieved by manual operation of said timing switch means into said second open position.

8. Control apparatus as defined in claim 7, wherein said timing amplifier means of said timing circuit means comprises a solid-state semi-conductor amplifier device of a type wherein said three electrodes comprise a collector, an emitter, and a base.

9. Control apparatus as defined in claim 7, wherein each of said amplifier means of said cycling circuit means and said timing circuit means comprises a solid-state semi-conductor amplifier device of a type wherein said three electrodes comprise a collector, an emitter, and a base.

10. Control apparatus as defined in claim 4, wherein said amplifier means of said cycling circuit means comprises a solid-state semi-conductor amplifier device of a type wherein said three electrodes comprise a collector, an emitter, and a base.

References Cited

UNITED STATES PATENTS

| | | |
|---|---|---|
| 2,927,254 | 3/1960 | Faulkner. |
| 2,962,609 | 11/1960 | MacDonald. |
| 3,082,357 | 3/1963 | Braverman ________ 317—141 |
| 3,113,242 | 12/1963 | Leeder. |
| 3,286,135 | 11/1966 | Haver et al. _______ 317—148.5 |
| 3,325,657 | 6/1967 | Corey. |

ROBERT K. SCHAEFER, *Primary Examiner.*

T. B. JOIKE, *Assistant Examiner.*